United States Patent [19]

Kato et al.

[11] Patent Number: 4,652,480
[45] Date of Patent: Mar. 24, 1987

[54] FLEXIBLE DISK

[75] Inventors: Mikihiko Kato; Shigeo Komine; Yasutoshi Okuzawa; Kazuhiko Morita, all of Odawara, Japan

[73] Assignee: Fuji Photo Film Co., Ltd., Tokyo, Japan

[21] Appl. No.: 670,959

[22] Filed: Nov. 13, 1984

[30] Foreign Application Priority Data

Nov. 17, 1983 [JP] Japan .................................. 58-216847

[51] Int. Cl.⁴ ................................................ G11B 5/72
[52] U.S. Cl. .......................................... 428/65; 427/44; 427/54.1; 427/131; 427/128; 428/64; 428/215; 428/216; 428/694; 428/900; 428/537.5; 428/137; 428/195
[58] Field of Search ................... 360/133, 99, 134–136; 428/65, 64, 336, 137, 195, 423.9, 480, 694, 695, 900, 215, 216, 537.5; 427/44, 54.1, 128, 131

[56] References Cited

U.S. PATENT DOCUMENTS

| | | | |
|---|---|---|---|
| 3,466,156 | 9/1969 | Peters | 427/132 |
| 4,052,750 | 10/1977 | Barber | 360/133 |
| 4,387,114 | 6/1983 | Conner | 427/284 |
| 4,486,500 | 12/1984 | Naruo | 428/900 |
| 4,523,246 | 6/1985 | Okuzawa | 360/133 |
| 4,539,220 | 9/1985 | Martinelli | 427/128 |
| 4,578,299 | 3/1986 | Kato | 428/695 |
| 4,581,270 | 4/1986 | Kato | 428/695 |

Primary Examiner—Ellis P. Robinson
Attorney, Agent, or Firm—Pasquale A. Razzano

[57] ABSTRACT

A flexible disk comprises a flexible disk jacket having a central opening and a disk-like magnetic recording medium having a central opening smaller than the central opening of the flexible disk jacket in diameter. The recording medium is accommodated for rotation in the flexible disk jacket so that their central openings are concentrically positioned and the portion of the recording medium surrounding the central opening is exposed through the central opening of the jacket, thereby giving access thereto. The portion of the recording medium surrounding the central opening is provided with a protective layer on one side thereof and a reinforcement ring on the other side thereof. The protective layer is formed of a composition which contains a compound with at least one unsaturated bond per molecule that is polymerizable by ultraviolet rays, and which has been cured by exposure to ultraviolet rays.

8 Claims, 7 Drawing Figures

FLEXIBLE DISK

BACKGROUND OF THE INVENTION

1. Field of the Invention

This invention relates to a flexible disk comprising a flexible casing (generally referred to as a "flexible disk jacket") and a disk-like magnetic recording medium accommodated therein for rotation.

2. Description of the Prior Art

There has been known, as a medium for magnetic recording and magnetic reproduction, a flexible disk comprising a flexible disk jacket having a central opening and a disk-like magnetic recording medium having a central opening smaller than the central opening of the flexible disk jacket in diameter. The recording medium is accommodated for rotation in the flexible disk jacket so that their central openings are substantially concentrically positioned and the portion of the recording medium around the central opening is exposed through the central opening of the jacket, thereby giving access thereto. A positioning member of a magnetic recording-/reproducing system is arranged to gain access to the recording medium through the central opening of the jacket and to center the recording medium, with respect to the driving shaft of the system, which is loosely held in the jacket to be movable with respect to the jacket to a certain extent. The positioning member generally includes a collet which is inserted into the central opening of the recording medium from one side thereof to center the recording medium and is associated with a rotating member abutting against the recording medium from the other side thereof to hold the recording medium in place during recording or reproduction. However, since the recording medium is loosely held in the jacket and is movable with respect thereto, there is a possibility that the recording medium is not properly centered with respect to the positioning member to be held in a wrong position when the flexible disk is loaded in the system with the recording medium not being positioned in a predetermined position with respect to the jacket in which the center of the central opening of the recording medium is aligned with the center of the central opening of the jacket. This problem will be described in more detail with reference to FIGS. 1 to 4.

In FIGS. 1A and 1B showing a typical flexible disk, a disk-like recording medium 2 is accommodated for rotation in a square flexible jacket 1. The jacket 1 is provided with a central opening 1a and the recording medium 2 is provided with a central opening 2a. The central opening 2a of the recording medium 2 is smaller than the central opening 1a of the jacket 1 and the portion of the recording medium 2 surrounding the central opening 2a, i.e. the inner peripheral portion of the recording medium 2, is exposed through the central opening 1a of the jacket 1.

When the flexible disk is loaded in a recording/reproducing system, a rotating portion 3 of a positioning member of the system is brought into abutment against the recording medium 2 from below and a collet 4 is inserted into a circular recess 3a formed in the rotating portion 3 as shown in FIG. 2. In conventional flexible disks, a part of the inner peripheral portion surrounding the central opening 2a is apt to be sandwiched between the collet 4 and the rotating portion 3 as shown in FIG. 4 when the collet 4 is inserted into the recess 3a of the rotating portion 3 with the recording medium 2 displaced so that the central opening 2a is not concentric with the central opening 1a of the jacket 1. When a part of the inner peripheral portion is sandwiched between the collet 4 and the rotating portion 3, flatness of the recording surface of the recording medium 2 is lost and at the same time the recording medium 2 is fixed with respect to the driving mechanism of the system in an eccentric manner, thereby adversely affecting recording or reproduction.

In order to hold the recording medium 2 in a proper position as shown in FIG. 4, it is preferred that the friction coefficient between the recording medium 2 and the rotating portion 3 be as small as possible, and that the mechanical strength of the inner peripheral portion of the recording medium 2 surrounding the central opening 2a thereof be high.

In Japanese Unexamined Patent Publication No. 57(1982)-113422, it is proposed to provide the inner peripheral portion of the recording medium (to be brought into contact with the positioning member) with a protective layer containing fatty ester and polyolefin polymerizable by ultraviolet rays, thereby reducing the friction coefficient between the inner peripheral portion of the recording medium and the positioning member. In U.S. Pat. No. 4,052,750, it is proposed to bond an annular reinforcement member (resilient ring) to the inner peripheral portion of the recording medium in order to increase the mechanical strength thereof. However, the technique of the Japanese Unexamined Patent Publication does not increase the mechanical strength of the inner peripheral portion of the recording medium, though it reduces the friction coefficient between the recording medium and the positioning member of the system, while the technique of the U.S. Patent does not reduce the friction coefficient though it increases the mechanical strength.

SUMMARY OF THE INVENTION

In view of the foregoing observations and description, the primary object of the present invention is to provide an improved flexible disk in which the mechanical strength of the inner peripheral portion of the recording medium is increased and at the same time the friction coefficient between the inner peripheral portion of the recording medium and the positioning member of the recording/reproducing system is lowered so that the recording medium can be properly centered even if the recording medium is not positioned in the flexible jacket with the central opening thereof concentric with the central opening of the jacket when the flexible disk is loaded in the system.

In accordance with the present invention, a protective layer is annularly provided on one side of the inner peripheral portion of the recording medium and an annular reinforcement is fixed to the other side of the inner peripheral portion of the recording medium. The protective layer is formed of a composition which contains a compound with at least one unsaturated bond per molecule that is polymerizable by ultraviolet rays, and has been cured by exposure to ultraviolet rays.

DESCRIPTION OF THE PREFERRED EMBODIMENT

Figure 1A:
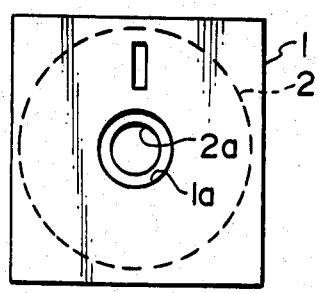
FIGS. 1A and 1B are a schematic plan view and a cross-sectional view of a conventional flexible disk, respectively.
Figure 1B:
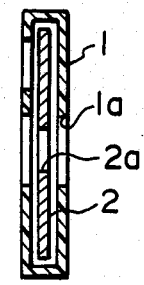
Figure 2:
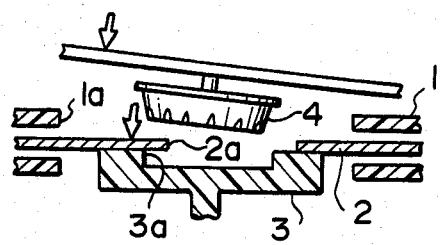
FIGS. 2 and 3 are schematic views illustrating a problem with the conventional flexible disk shown in FIGS. 1A and 1B.
Figure 3:
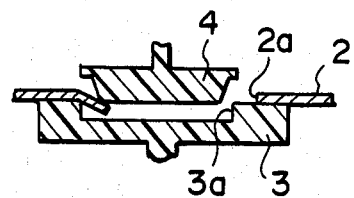
Figure 4:
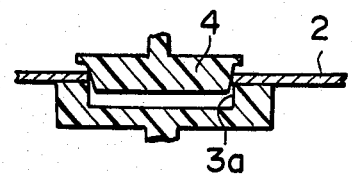
FIG. 4 is a view similar to FIG. 3 but showing the state in which the recording medium is properly centered.
Figure 5:
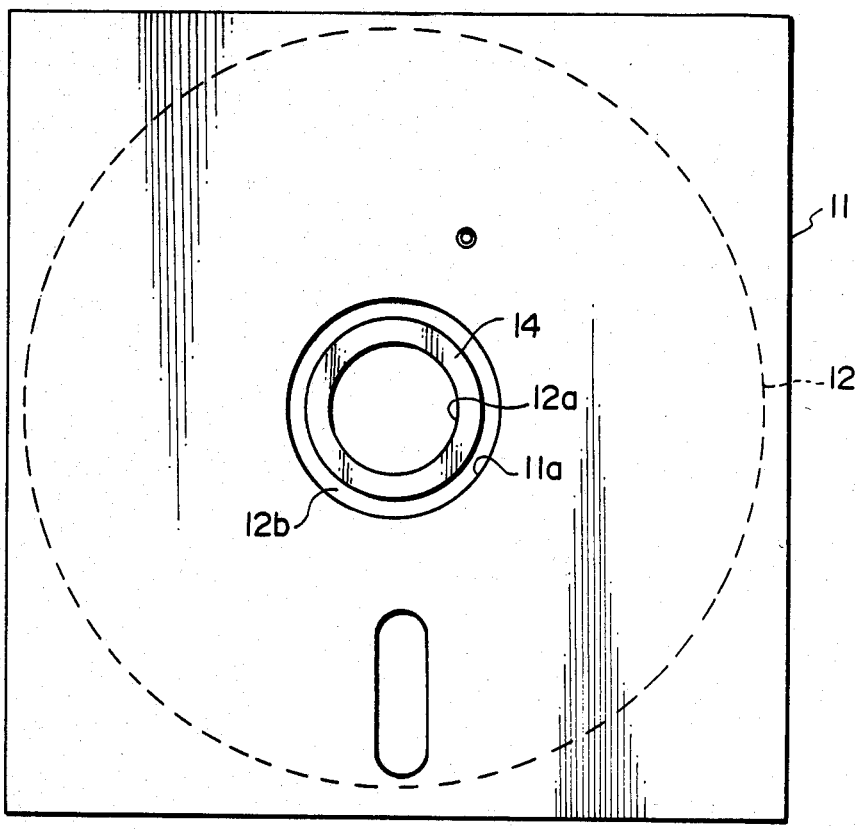
FIG. 5 is a schematic plan view of a flexible disk in accordance with an embodiment of the present invention.
Figure 6:
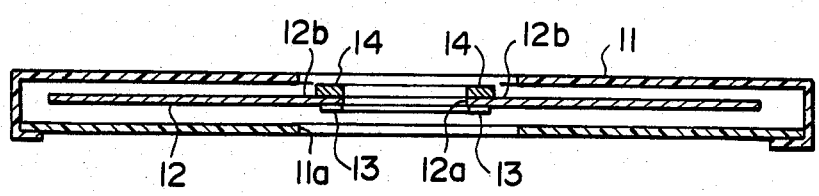
FIG. 6 is a schematic cross-sectional view of the same.

In FIGS. 5 and 6, a flexible disk in accordance with an embodiment of the present invention comprises a flexible disk jacket 11 having a central opening 11a and a magnetic recording medium 12 which is accommodated in the jacket 11 and is provided with a central opening 12a. The central opening 12a of the recording medium 12 is smaller than the central opening 11a of the jacket 11 in diameter and the portion of the recording medium 12 surrounding the central opening 12a, i.e. the inner peripheral portion 12b of the recording medium 12, is adapted to be exposed through the central opening 11a of the jacket 11 as in the conventional flexible disks. On one side of the inner peripheral portion 12b of the recording medium 12 is provided an annular protective layer 13 formed of a composition containing a compound with at least one unsaturated bond per molecule and that is polymerizable by ultraviolet rays, e.g., UV ink. To the other side of the inner peripheral portion 12b of the recording medium 12 is bonded a reinforcement ring 14 which is preferably formed of plastic material such as polyester or of paper.

The compound having an unsaturated bond that is polymerizable by ultraviolet rays (This compound will be sometimes referred to as "the relevant compound" hereinbelow) should have at least one carbon-to-carbon unsaturated bond and such compounds include unsaturated polyesters and compounds containing an acryloyl group, an acrylamide group, an aryl group, a vinyl ether, a vinyl thioether, or the like. For example, there are included methyl acrylate, alkyl acrylate ester which is a homologue of methyl acrylate, styrene, homologues of styrene such as α-methylstyrene and β-chlorostyrene, acrylonitrile, vinyl acetate and vinyl propionate. Further, there may be included compounds having a plurality of unsaturated bonds per molecule such as those listed in "A Collection of Data on Photosensitive Resins" (pp. 235 and 236) published by Kabushikikaisha Sogokagaku Kenkyusho, December, 1968. Unsaturated esters of polyols such as ethylene diacrylate, diethylene glycol diacrylate, glycerol triacrylate, or pentaerythritol tetraacrylate, and glycidyl acrylate having an epoxy ring are particularly preferred. Further, the composition for forming the protective layer 13 may comprise a mixture of compounds having one unsaturated bond per molecule and having a plurality of unsaturated bonds per molecule. Further, the relevant compound may be a high polymer, preferably one having an acrylate group on one end of the backbone chain thereof or in a side chain thereof. Such high polymers are described in "Fatipec Congress" 11 19(1972) by A. Vrancken, and are, for example, represented by the following formula:

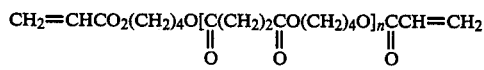

Compounds represented by a formula obtained by replacing the polyester skeleton in the above formula with a polyurethane skeleton, an epoxy resin skeleton, a polyether skeleton or a polycarbonate skeleton or by replacing the polyester skeleton with a combination of these skeletons may be included in the relevant compound. The composition for forming the protective layer 13 may contain a mixture of the monomers and polymers described above. The relevant compound is preferred to have a molecular weight of 1000 to 20000.

The relevant compound described above can be made to be polymerizable by ultraviolet rays when mixed with a photopolymerization initiator such as benzophenone, benzoyl ethyl ether, benzyl methyl ketal, 1-hydroxycyclohexyl phenyl ketone, Michler's ketone or other aromatic ketones. Preferably, the photopolymerization initiator has a large absorptivity coefficient at wavelengths of the main radiation source in the emission spectrum of the lamp used as the ultraviolet ray source, e.g. 254, 313 and 365 nm in case that a mercury vapor lamp is used. Preferably, the aromatic ketone is mixed with the relevant unsaturated compound in the proportion of 0.5 to 20 weight parts, more preferably 2 to 15 weight parts and most preferably 3 to 10 weight parts per 100 weight parts of the relevant compound.

Anti-forming agent, wax, leveling agent, thixotropic agent, stabilizer and the like may be added to the UV ink, if desired. Further, lubricant may be added to the UV ink to further lower the friction coefficient between the recording medium 12 and the positioning member. As the lubricant, saturated or unsaturated higher fatty acids, fatty esters, higher fatty amides, higher alcohols, silicone oils, mineral oils, edible oils and fluorides are used, for example. The amount of the lubricant to be added to the relevant compound per 100 weight parts of the same is 0.1 to 20 weight parts, preferably 1 to 15 weight parts and more preferably 3 to 10 weight parts. The friction coefficient between the protective layer 13 and the rotating portion 3 of the positioning member should not be higher than 0.50 and is preferably not higher than 0.35.

When preparing the UV ink, various organic solvents may be used, if desired, though there is no need for solvent in the case that the relevant compound is liquid at ordinary temperature. For example, the following organic solvents may be used:

ketones such as acetone, methyl ethyl ketone, methyl isobutyl ketone, and cyclohexanone; alcohols such as methanol, ethanol, propanol, and butanol; esters such as methyl acetate, ethyl acetate, ethyl lactate and glycol monoethylether acetate; glycol ethers such as ethyl ether, glycol dimethyl ether, glycol monomethyl ether and dioxane; aromatic hydrocarbons contained in tar such as benzene, toluene and xylene; methylene chloride; ethylene chloride; carbon tetrachloride; chloroform; ethylene chlorohydrin; dichlorobenzene.

The UV ink may be applied to the recording medium 12 by screen printing, roll coating, gravure coating or the like. The thickness of the protective layer 13 should be 1 to 50 μm, and is preferably 5 to 30 μm and more preferably 10 to 20 μm. The width of the protective layer 13 is preferably about 3 mm. Said reinforcement ring 14 should have a thickness of 20 to 200 μm, preferably of 50 to 150 μm, and the width of the reinforcement ring 14 is preferably 3 to 5 mm with the diameter of the recording medium 12 being assumed to be about 200 mm or 130 mm. The reinforcement ring 14 may be attached to the recording medium 12 by various known methods. For example, it may be bonded to the recording medium 12 by adhesive or by ultrasonic welding.

A number of flexible disks in accordance with an embodiment of the present invention, that is, a number of flexible disks having a recording medium provided with a protective layer and a reinforcement ring were prepared. Further, first to fourth groups of comparison flexible disks were prepared in order to prove the effect of the present invention. The comparison flexible disks of the first group had a recording medium provided with neither protective layer nor reinforcement ring. The comparison flexible disks of the second group had a recording medium provided with a reinforcement ring only on the upper side (the side opposite to the side to be brought into contact with the rotating portion of the positioning member) and were not provided with a protective layer. The comparison flexible disks of the third group had a recording medium provided with a reinforcement ring only on the lower side and were not provided with a protective layer. The comparison flexible disks of the fourth group had a recording medium provided with a protective layer on each side. The reinforcement rings used in the flexible disks of the embodiment and the comparison flexible disks of the second group were the same and each comprised a polyester ring 100 μm thick and 3 mm wide. Each reinforcement ring was bonded to the recording medium by adhesive. The protective layers of the flexible disks of the embodiment and the comparison flexible disks of the third and fourth groups were the same and the composition of the protective layer was as follows:

urethane acrylate (M-1100 manufactured by Toa Gosei): 100 parts by weight
photopolymerization initiator (irgacure-651 manufactured by Ciba-Geigy AG): 5 parts by weight
lubricant (myristic-acid-modified silicone TA-930 manufactured by Shinetsu Kagaku): 5 parts by weight The friction coefficient between each recording medium and the rotating portion was measured and is shown in the following table. The friction coefficient was measured by rubbing the rotating portion against the recording medium feeding the rotating portion at a speed of 0.8 mm/sec. under load of 70 gram-weight. Further, the flexible disks were subjected to loading test using several different disk drives, i.e. YA280 and YA380 manufactured by Y-E.Data Company, JA751 and JA561 manufactured by Matsushita Denko, and M-2894 and M-4853 manufactured by Mitsubishi Denki.

Ten flexible disks were used for each disk drive and each flexible disk was repeatedly subjected to loading action into the disk drive fifty times. When a flexible disk was not properly loaded in the drive at least once out of fifty times, the flexible disk was considered to be a reject. The percentage of rejects is shown in the following table.

|  | friction coefficient | percentage of rejects | |
|---|---|---|---|
|  |  | RT | 50° C. 80% |
| Invention | 0.31 | 0% | 1% |
| COMPARISON |  |  |  |
| group 1 | 0.55 | 17% | 60% |
| group 2 | 0.55 | 15% | 20% |
| group 3 | 0.31 | 2% | 20% |
| group 4 | 0.32 | 1% | 7% |

As can be understood from the above table, by reducing the friction coefficient between the recording medium and the rotating portion below 0.35 by providing a protective layer, the percentage of rejects can be greatly lowered. Especially, by providing both the protective layer and the reinforcement ring, the percentage of rejects under high temperature and high humidity condition can be very greatly lowered.

We claim:

1. A flexible disk comprising a flexible disk jacket having a central opening and a disk-like magnetic recording medium which is accommodated for rotation in the flexible disk jacket and has a central opening, the central opening of the recording medium being smaller in diameter than the central opening of the flexible disk jacket so that the inner peripheral portion thereof surrounding the central opening is adapted to be exposed through the central opening of the flexible disk jacket wherein the improvement comprises a protective layer provided on one side of the inner peripheral portion only around the central opening of the recording medium and a reinforcement ring attached to the other side of the inner peripheral portion of the recording medium, said protective layer being formed of a composition which contains a compound with at least one unsaturated bond per molecule that is polymerizable by ultraviolet rays, and which has been cured by exposure to ultraviolet rays, said protective layer having a thickness of between 1 to 50 μm and said reinforcement ring having a thickness of between 20 to 200 μm.

2. A flexible disk as defined in claim 1 in which said reinforcement ring is formed of plastic material.

3. A flexible disk as defined in claim 1 in which said reinforcement ring is formed of paper.

4. A flexible disk as defined in claim 1 in which the thickness of said reinforcement ring is 50 to 150 μm.

5. A flexible disk as defined in claim 1, 2 or 3 in which the width of said reinforcement ring is 3 to 5 mm.

6. A flexible disk as defined in claim 1 in which the thickness of said protective layer is 5 to 30 μm.

7. A flexible disk as defined in claim 8 in which the thickness of said protective layer is 10 to 20 μm.

8. A flexible disk as defined in claim 1, 6 or 7 in which the width of said protective layer is about 3 mm.

* * * * *